US012603032B2

(12) United States Patent
Wang et al.

(10) Patent No.: US 12,603,032 B2
(45) Date of Patent: Apr. 14, 2026

(54) GAMMA TUNING METHOD, APPARATUS, AND COMPUTER-READABLE STORAGE MEDIUM

(71) Applicant: KUNSHAN GO-VISIONOX OPTO-ELECTRONICS CO., LTD., Kunshan (CN)

(72) Inventors: Yuqing Wang, Kunshan (CN); Tao Tang, Kunshan (CN); Qiong Jia, Kunshan (CN)

(73) Assignee: KUNSHAN GO-VISIONOX OPTO-ELECTRONICS CO., LTD., Kunshan (CN)

( * ) Notice: Subject to any disclaimer, the term of this patent is extended or adjusted under 35 U.S.C. 154(b) by 0 days.

(21) Appl. No.: 19/055,501

(22) Filed: Feb. 18, 2025

(65) Prior Publication Data

US 2025/0191512 A1 Jun. 12, 2025

Related U.S. Application Data

(63) Continuation of application No. PCT/CN2022/134678, filed on Nov. 28, 2022.

(30) Foreign Application Priority Data

Sep. 5, 2022 (CN) ......................... 202211079380.3

(51) Int. Cl.
*G09G 3/20* (2006.01)

(52) U.S. Cl.
CPC ... *G09G 3/2074* (2013.01); *G09G 2320/0242* (2013.01); *G09G 2320/0673* (2013.01)

(58) Field of Classification Search
None
See application file for complete search history.

(56) References Cited

U.S. PATENT DOCUMENTS

2017/0278448 A1* 9/2017 Zhang .................. G09G 3/2074
2022/0301482 A1* 9/2022 Wang ..................... G09G 3/006
2024/0112616 A1* 4/2024 Han ..................... G09G 3/3225

FOREIGN PATENT DOCUMENTS

CN 104157255 A 11/2014
CN 105590587 A 5/2016
CN 111833793 A 10/2020
CN 113140196 A 7/2021

(Continued)

OTHER PUBLICATIONS

First Office Action of Application No. CN 202211079380.3.
International Search Report of Application No. PCT/CN2022/134678.

*Primary Examiner* — Kenneth Bukowski
(74) *Attorney, Agent, or Firm* — Kilpatrick Townsend & Stockton LLP

(57) ABSTRACT

A gamma tuning method, apparatus, and computer-readable storage medium. The gamma tuning method is applied to a display panel including a first display area and a second display area, and the gamma tuning method includes: acquiring a first register value of the first display area after gamma tuning under a target gray scale; and determining, according to the first register value and a predetermined linear relationship between register values of the first display area and register values of the second display area, a target register value of the second display area under the target gray scale.

12 Claims, 4 Drawing Sheets

(56) References Cited

FOREIGN PATENT DOCUMENTS

| | | | | | |
|---|---|---|---|---|---|
| CN | 114927086 | A | * | 8/2022 | ........... G09G 3/3208 |
| CN | 115359751 | A | | 11/2022 | |
| WO | 2022001321 | A1 | | 1/2022 | |
| WO | 2022126337 | A1 | | 6/2022 | |
| WO | WO-2022222635 | A1 | * | 10/2022 | ............... G09G 5/10 |

* cited by examiner intercept display panel

GAMMA TUNING METHOD, APPARATUS, AND COMPUTER-READABLE STORAGE MEDIUM

CROSS REFERENCE TO RELATED APPLICATION

The present application is a continuation application of International Application No. PCT/CN2022/134678, filed on Nov. 28, 2022, which claims the benefit of priority to Chinese Patent Application No. 202211079380.3 filed on Sep. 5, 2022, both of which are incorporated herein by reference in their entireties.

FIELD

The present application relates to the field of display technology, and particularly to a gamma tuning method, apparatus, and computer-readable storage medium.

BACKGROUND

In order to enable a display panel to have a higher screen-to-body ratio, the display panel may include a main screen and a sub-screen, both of which may be used for displaying images. In addition to displaying images, a camera may be arranged under the sub-screen and acquires an external image through the sub-screen. Such a camera arranged under a screen is called an Under Display Camera (UDC), and thus the sub-screen may also be called a UDC area.

In order to meet display requirements, it is usually necessary to perform gamma tuning on the main screen and sub-screen of the display panel before the display panel coming into the market, to ensure that the display effect of the display panel meets the display requirements.

However, the inventors of the present application have found that the current gamma tuning process takes a relatively long time, and thus the production efficiency of the display panel is relatively low. In one embodiment, as the number of refresh rates supported by the display panel increases, the time required for the gamma tuning process of the display panel becomes longer and longer, which severely limits the production efficiency of the display panel.

SUMMARY

Embodiments of the present application provide a gamma tuning method, apparatus, and computer-readable storage medium, which can reduce gamma tuning time and improve the production efficiency of a display panel.

One embodiments of the present application provides a gamma tuning method applied to a display panel including a first display area and a second display area, and the gamma tuning method includes: acquiring a first register value of the first display area after gamma tuning under a target gray scale; and determining, according to the first register value and a predetermined linear relationship between register values of the first display area and register values of the second display area, a target register value of the second display area under the target gray scale.

One embodiments of the present application provides a gamma tuning apparatus applied to a display panel including a first display area and a second display area, and the gamma tuning apparatus includes: a first acquiring module configured to acquire a first register value of the first display area after gamma tuning under a target gray scale; and a first determining module configured to determine, according to the first register value and a predetermined linear relationship between register values of the first display area and register values of the second display area, a target register value of the second display area under the target gray scale.

The embodiments of the present application provide a computer-readable storage medium storing a computer program thereon, in which the computer program, when executed by a processor, implements the steps of the gamma tuning method according to the embodiments.

In the gamma tuning method, apparatus, and computer-readable storage medium according to the embodiments of the present application, the gamma tuning method is applied to a display panel including a first display area and a second display area, and the gamma tuning method includes: acquiring a first register value of the first display area after gamma tuning under a target gray scale; and determining, according to the first register value and a predetermined linear relationship between register values of the first display area and register values of the second display area, a target register value of the second display area under the target gray scale. In the embodiments of the present application, the target register value of the second display area under the target gray scale is determined directly according to the first register value of the first display area under the target gray scale and the linear relationship between register values of the first display area and register values of the second display area, and thus it is not necessary to perform gamma tuning on the second display area under the target gray scale; not only it is ensured that no color deviation occurs in the second display area, but also gamma tuning time for the second display area and the whole display panel is saved, which improves the production efficiency of the display panel.

BRIEF DESCRIPTION OF THE DRAWINGS

In order to illustrate embodiments of the present application more clearly, the drawings required for the embodiments of the present application will be briefly described.

DETAILED DESCRIPTION

Figure 1:
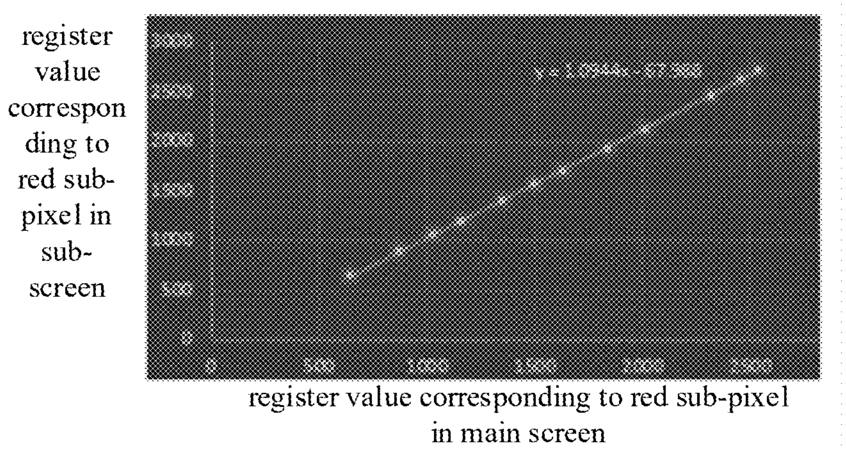
FIG. 1 shows a schematic diagram illustrating a linear relationship between register values corresponding to red sub-pixels in a main screen and register values corresponding to red sub-pixels in a sub-screen in a display panel.

Features and exemplary embodiments of various embodiments of the present application will be described in detail below. In order to embodiments of the present application clearer, the present application is further described in detail below with reference to the drawings and embodiments. It should be understood that the embodiments described herein are only used to explain the present application, but not to limit the present application. Embodiments of the present application can be implemented without some of these specific details. The following description of the embodiments is only to provide a better understanding of the present application by illustrating examples of the present application.

It should be understood that the term "and/or" as used herein only refers to an association relationship for describing the associated objects, which may include three possible relationships. For example, "A and/or B" may represent: An alone, both A and B, and B alone. In addition, the character "/" herein generally refers to an "or" relationship between the associated objects.

Various modifications and variations can be made in the present application without departing from the gist or scope of the present application. Thus, the present application is intended to encompass the modifications and variations of the present application that fall within the scope of the corresponding claims (the embodiments claimed to be protected) and their equivalents. It should be noted that, the implementations according to the embodiments of the present application can be combined with each other without contradiction.

Before the embodiments of the present application are described, the problems in the related art are first specified to facilitate the understanding of the embodiments of the present application.

As described previously, in order to enable a display panel to have a higher screen-to-body ratio, the display panel may include a main screen and a sub-screen, both of which may be used for displaying images. In addition to displaying images, a camera may be arranged under the sub-screen and acquires an external image through the sub-screen. Such a camera arranged under a screen is called an Under Display Camera (UDC), and thus the sub-screen may also be called a UDC area.

In order to meet display requirements, it is usually necessary to perform gamma tuning on the main screen and sub-screen of the display panel before the display panel coming into the market, to ensure that the display effect of the display panel meets the display requirements.

With the development of display technology, the number of refresh rates supported by the display panel has increased. For example, in addition to the original refresh rate (such as 60 Hz), some current display panels further support refresh rates 120 Hz and/or 144 Hz. As a result, besides the gamma tuning originally performed on various gray scales at only the original refresh rate, gamma tuning is further performed on various gray scales at the new refresh rates 120 Hz and/or 144 Hz, and the gamma tuning time is nearly doubled. Therefore, as the number of refresh rates supported by the display panel increases, the time required for the gamma tuning process of the display panel becomes longer and longer, which severely limits the production efficiency of the display panel.

Figure 2:
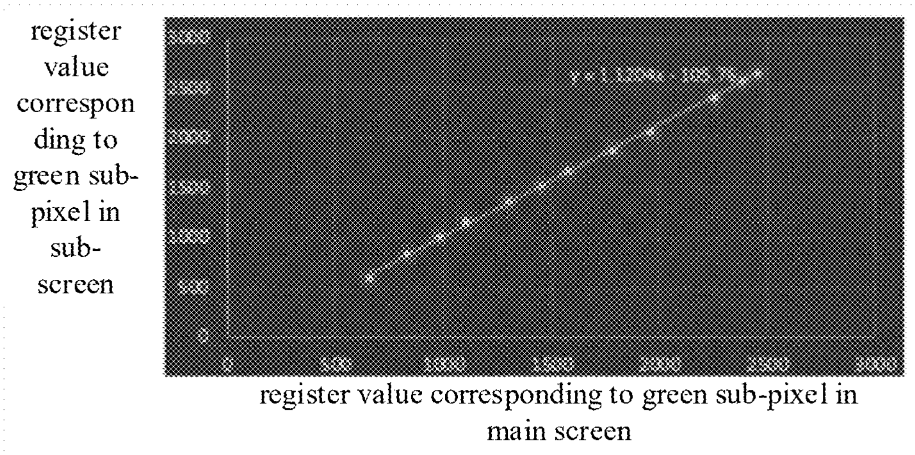
FIG. 2 shows a schematic diagram illustrating a linear relationship between register values corresponding to green sub-pixels in a main screen and register values corresponding to green sub-pixels in a sub-screen in a display panel.
Figure 3:
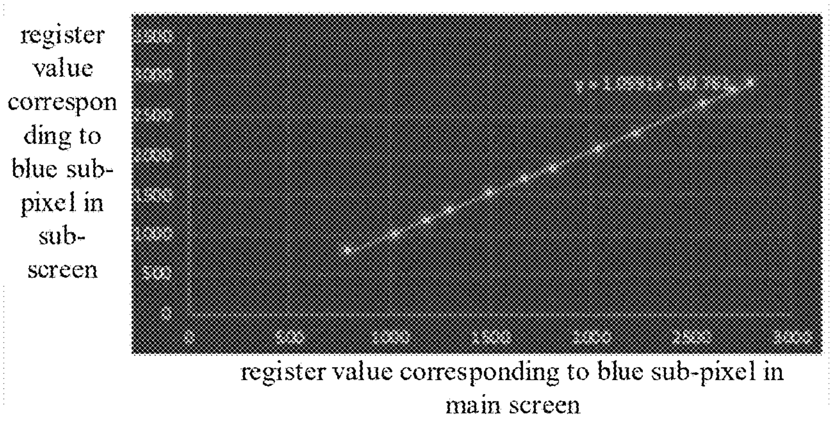
FIG. 3 shows a schematic diagram illustrating a linear relationship between register values corresponding to blue sub-pixels in a main screen and register values corresponding to blue sub-pixels in a sub-screen in a display panel.

Through a large number of gamma tuning experiments on a main screen and a sub-screen of a single display panel, the inventors of the present application have further found that a certain linear relationship exists between register values of the main screen and register values of the sub-screen, i.e., a first-order function $y=ax\pm b$. FIG. 1 shows a schematic diagram illustrating a linear relationship between register values corresponding to red sub-pixels in a main screen and register values corresponding to red sub-pixels in a sub-screen in a display panel. FIG. 2 shows a schematic diagram illustrating a linear relationship between register values corresponding to green sub-pixels in a main screen and register values corresponding to green sub-pixels in a sub-screen in a display panel. FIG. 3 shows a schematic diagram illustrating a linear relationship between register values corresponding to blue sub-pixels in a main screen and register values corresponding to blue sub-pixels in a sub-screen in a display panel.

The abscissa x in FIG. 1 shows the register value corresponding to the red sub-pixel in the main screen, and the ordinate y in FIG. 1 shows the register value corresponding to the red sub-pixel in the sub-screen. The abscissa x in FIG. 2 shows the register value corresponding to the green sub-pixel in the main screen, and the ordinate y in FIG. 2 shows the register value corresponding to the green sub-pixel in the sub-screen. The abscissa x in FIG. 3 shows the register value corresponding to the blue sub-pixel in the main screen, and the ordinate y in FIG. 3 shows the register value corresponding to the blue sub-pixel in the sub-screen. As shown in FIGS. 1 to 3, for example, in one experiment, the linear relationship between the register value corresponding to the red sub-pixel in the main screen and the register value corresponding to the red sub-pixel in the sub-screen is: $y=1.0944x-67.988$. The linear relationship between the register value corresponding to the green sub-pixel in the main screen and the register value corresponding to the green sub-pixel in the sub-screen is: $y=1.1204x-105.76$. The linear relationship between the register value corresponding to the blue sub-pixel in the main screen and the register value corresponding to the blue sub-pixel in the sub-screen is: $y=1.0591x-50.761$. It can be seen that a linear relationship exists between the register value corresponding to the red sub-pixel in the main screen and the register value corresponding to the red sub-pixel in the sub-screen, a linear relationship exists between the register value corresponding to the green sub-pixel in the main screen and the register value corresponding to the green sub-pixel in the sub-screen, and a linear relationship exists between the register value corresponding to the blue sub-pixel in the main screen and the register value corresponding to the blue sub-pixel in the sub-screen.

In view of the above, the embodiments of the present application provide a gamma tuning method, apparatus, and computer-readable storage medium, which can solve the problems in the related art such as long gamma tuning time and low production efficiency of a display panel.

The embodiments of the present application is as follows: the target register value of the second display area under the target gray scale is determined directly according to the first register value of the first display area under the target gray scale and the linear relationship between register values of the first display area and register values of the second display area, and thus it is not necessary to perform gamma tuning on the second display area under the target gray scale; not only it is ensured that no color deviation occurs in the second display area, but also gamma tuning time for the second display area and the whole display panel is saved, which improves the production efficiency of the display panel.

The gamma tuning method according to the embodiments of the present application will be first described below.

The gamma tuning method according to the embodiments of the present application may be applied to a display panel which may include a first display area and a second display area. Both the first display area and the second display area are provided with pixels, i.e., both the first display area and the second display area can display an image. In some examples, a light transmittance of the first display area may be different from a light transmittance of the second display area. For example, the first display area may be the above-mentioned main screen (i.e., a normal display area), and the second display area may be the sub-screen (i.e., a UDC area). In some embodiments, the first display area may be the above-mentioned sub-screen, and the second display area may be the main screen, which is not limited in the embodiments of the present application.

Figure 4:
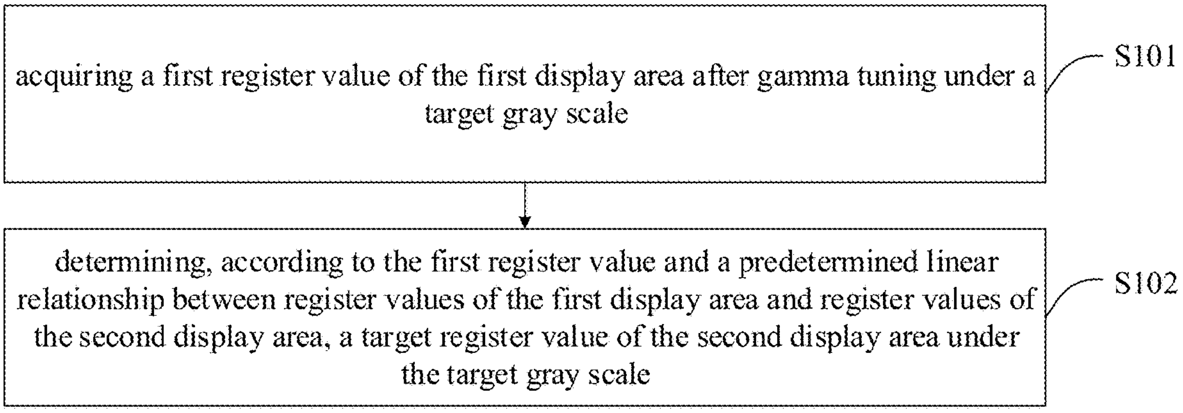
FIG. 4 shows a schematic flow diagram of a gamma tuning method according to an embodiment of the present application.

FIG. 4 shows a schematic flow diagram of a gamma tuning method according to an embodiment of the present application. As shown in FIG. 4, the gamma tuning method according to the embodiments of the present application may include the following steps S101 and S102.

S101: acquiring a first register value of the first display area after gamma tuning under a target gray scale.

Herein, the target gray scale may be any of a plurality of preset gray scales, such as any of gray scales 0-254. After the gamma tuning on the first display area, the register values of the first display area under various gray scales may be determined. Herein, the register value is a register value of a register, such as a register value of a 51 register. To facilitate differentiation, a register value of the first display area under the target gray scale is referred to as the first register value.

S102: determining, according to the first register value and a predetermined linear relationship between register values of the first display area and register values of the second display area, a target register value of the second display area under the target gray scale.

As described previously, a linear relationship exists between register values of the first display area and register values of the second display area. Then, in S102, the target register value of the second display area under the target gray scale can be calculated from the first register value of the first display area under the target gray scale and the linear relationship between register values of the first display area and register values of the second display area.

In the conventional gamma tuning method, gamma tuning needs to be performed on the first display area under a plurality of gray scales, and gamma tuning also needs to be performed on the second display area under a plurality of gray scales, and thus gamma tuning time is long and the production efficiency of the display panel is low.

In the gamma tuning method according to the embodiments of the present application, the target register value of the second display area under the target gray scale is determined according to the first register value of the first display area under the target gray scale and the linear relationship between register values of the first display area and register values of the second display area, and thus it is not necessary to perform gamma tuning on the second display area under the target gray scale; not only it is ensured that no color deviation occurs in the second display area, but also gamma tuning time for the second display area and the whole display panel is saved, which improves the production efficiency of the display panel.

According to some embodiments of the present application, the first display area and the second display area may each include sub-pixels of n colors, the first register value may include first sub-register values corresponding to the sub-pixels of n colors in one-to-one correspondence, and n is an integer greater than or equal to 1.

Accordingly, the determining, according to the first register value and the predetermined linear relationship between register values of the first display area and register values of the second display area, the target register value of the second display area under the target gray scale at S102 may include: for a sub-pixel of any $i^{th}$ color of the sub-pixels of n colors, determining, according to the first sub-register value corresponding to the sub-pixel of the $i^{th}$ color and a linear relationship between a register value of the sub-pixel of the $i^{th}$ color in the first display area and a register value of the sub-pixel of the $i^{th}$ color in the second display area, a target register value of the sub-pixel of the $i^{th}$ color in the second display area under the target gray scale.

That is, for sub-pixels of different colors, the above-mentioned linear relationships corresponding to the sub-pixels of different colors may be different. For a sub-pixel of each color, the target register value of the sub-pixel of the color in the second display area under the target gray scale may be determined according to the first register value of the sub-pixel of the color in the first display area after gamma tuning under the target gray scale and a linear relationship between a register value of the sub-pixel of the color in the first display area and a register value of the sub-pixel of the color in the second display area.

In some embodiments, the first display area and the second display area may each include sub-pixels of three colors, i.e., red sub-pixels, green sub-pixels and blue sub-pixels. Accordingly, in S102, for the red sub-pixel, a target register value of the red sub-pixel in the second display area under the target gray scale may be determined according to the first sub-register value of the red sub-pixel in the first display area after gamma tuning under the target gray scale and a linear relationship between a register value of the red sub-pixel in the first display area and a register value of the red sub-pixel in the second display area. For the green sub-pixel, a target register value of the green sub-pixel in the second display area under the target gray scale may be determined according to the first sub-register value of the green sub-pixel in the first display area after gamma tuning under the target gray scale and a linear relationship between a register value of the green sub-pixel in the first display area and a register value of the green sub-pixel in the second display area. For the blue sub-pixel, a target register value of the blue sub-pixel in the second display area under the target gray scale may be determined according to the first sub-register value of the blue sub-pixel in the first display area after gamma tuning under the target gray scale and a linear relationship between a register value of the blue sub-pixel in the first display area and a register value of the blue sub-pixel in the second display area.

It should be noted that, in other embodiments, the first display area and the second display area may further include sub-pixels of other colors in addition to the red sub-pixel, the green sub-pixel and the blue sub-pixel, such as white sub-pixels (sub-pixels W) or yellow sub-pixels (sub-pixels Y), which is not limited in the embodiments of the present application. Under a condition that the first display area and the second display area further include sub-pixels of other colors, target register values of the sub-pixels of other colors in the second display area under the target gray scale may also be determined in a similar manner as described above, which is not repeated herein for simplicity of description.

In this manner, for the sub-pixels of different colors, the target register values of the sub-pixels of different colors in the second display area under the target gray scale are calculated respectively from the linear relationships between register values of the first display area and register values of the second display area corresponding to the sub-pixel of the various color, which can further improve the accuracy of the finally obtained target register values of the sub-pixels of different colors in the second display area under the target gray scale, and ensure that the brightness and chromaticity of the second display area meet the expected requirements.

According to some embodiments of the present application, history register values of a plurality of display panels, including a first history register value of the first display area of each display panel and a second history register value of the second display area of each display panel, may be retrieved, for example, from production data (i.e., history data), and then the linear relationship between register values of the first display area and register values of the second display area of the display panel may be obtained directly by curve fitting. In some examples, for example, for first history register values of the first display areas of the plurality of display panels and second history register values of the second display areas of the plurality of display panels, the linear relationship $y=ax\pm b$ between register values of the first display area and register values of the second display area of the display panel may be quickly obtained using Visual Basic for Applications (VBA) programming.

However, the inventors of the present application have further found that there is a certain deviation in the register value of the second display area calculated directly from the linear relationship $y=ax\pm b$ obtained by curve fitting (e.g., VBA programming) of large data, and there may be a risk of color deviation for the second display area, which is analyzed in detailed below.

Figure 5:
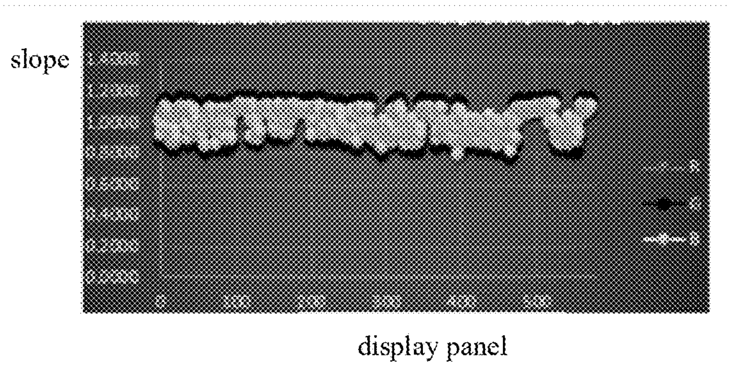
FIG. 5 shows a schematic diagram illustrating a slope of a linear relationship between register values corresponding to sub-pixels of various colors in first display areas and register values corresponding to sub-pixels of various colors in second display areas in a plurality of display panels.
Figure 6:
FIG. 6 shows a schematic diagram illustrating an intercept of a linear relationship between register values corresponding to sub-pixels of various colors in first display areas and register values corresponding to sub-pixels of various colors in second display areas in a plurality of display panels.

FIG. 5 shows a schematic diagram illustrating a slope of a linear relationship between register values corresponding to sub-pixels of various colors in first display areas and register values corresponding to sub-pixels of various colors in second display areas in a plurality of display panels. FIG. 6 shows a schematic diagram illustrating an intercept of a linear relationship between register values corresponding to sub-pixels of various colors in first display areas and register values corresponding to sub-pixels of various colors in second display areas in a plurality of display panels. The abscissa in FIG. 5 represents different display panels, and the ordinate in FIG. 5 represents the slope of the linear relationship between the register values corresponding to the sub-pixels of various colors in the first display areas and the register values corresponding to the sub-pixels of various colors in the second display areas. The abscissa in FIG. 6 represents different display panels, and the ordinate in FIG. 6 represents the intercept of the linear relationship between the register values corresponding to the sub-pixels of various colors in the first display areas and the register values corresponding to the sub-pixels of various colors in the second display areas.

As shown in FIG. 5, the inventors of the present application have further found that, for all of the red sub-pixel R, the green sub-pixel G, and the blue sub-pixel B, the difference in the slopes of the linear relationships between register values of the first display area and register values of the second display area corresponding to different display panels is small, i.e., the slopes tend to be stable. As shown in FIG. 6, for all of the red sub-pixel R, the green sub-pixel G, and the blue sub-pixel B, the difference in the intercepts of the linear relationships between register values of the first display area and register values of the second display area corresponding to different display panels is great, i.e., the difference in the intercepts corresponding to different display panels is great.

In view of the above, the inventors of the present application considered that since the difference in the slopes of the linear relationships corresponding to different display panels is small, when determining the slope of the linear relationship corresponding to a target display panel, the slope of the linear relationship corresponding to the target display panel may be determined according to history register values of test display panels (i.e., other display panels). However, since the difference in the intercepts of the linear relationships corresponding to different display panels is great, when determining the intercept of the linear relationship corresponding to the target display panel, the intercept of the linear relationship corresponding to the target display panel may be determined according to register values of the first display area and the second display area of the target display panel itself under a certain gray scale. In this way, the obtained linear relationship between register values of the first display area and register values of the second display area of the target display panel conforms to the actual situation of the target display panel itself, i.e., has higher accuracy, to ensure the accuracy of the finally obtained target register value.

Figure 7:
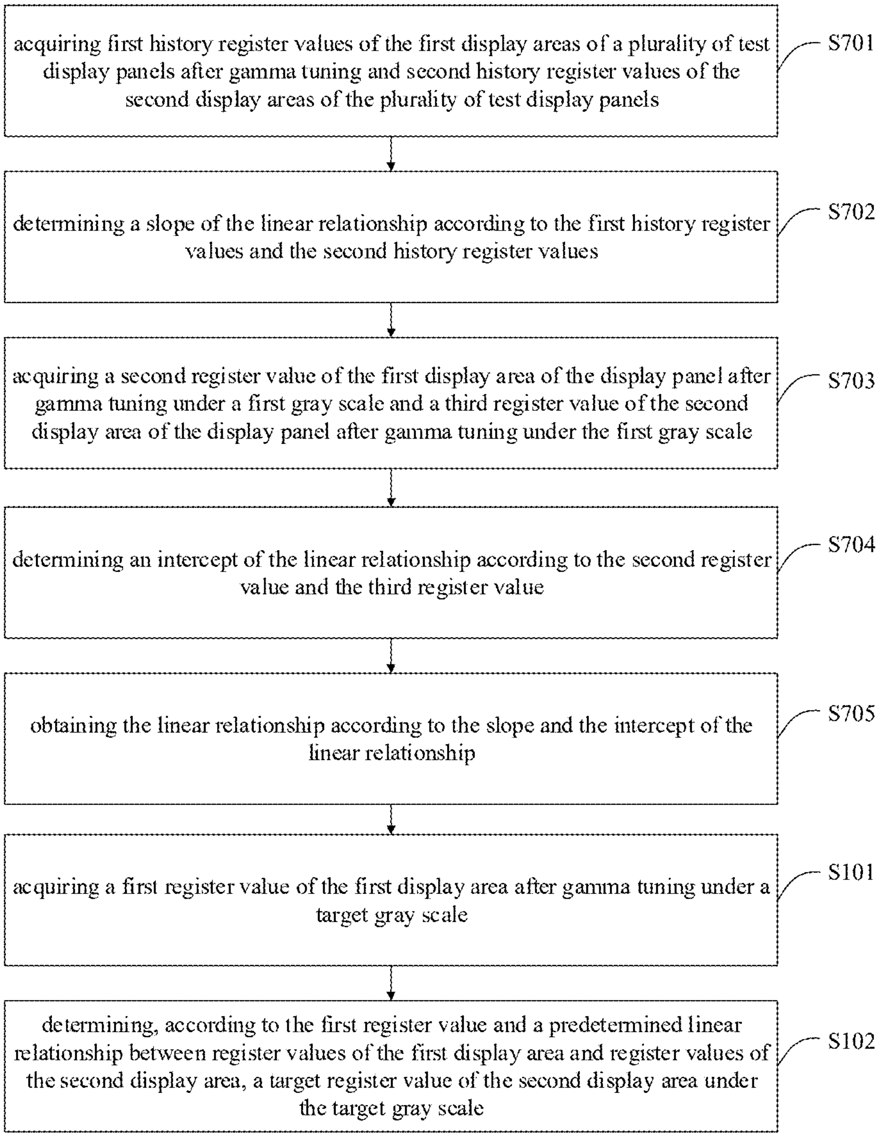
FIG. 7 shows another schematic flow diagram of a gamma tuning method according to an embodiment of the present application.

FIG. 7 shows another schematic flow diagram of a gamma tuning method according to an embodiment of the present application. As shown in FIG. 7, according to some embodiments of the present application, before the acquiring the first register value of the first display area after gamma tuning under the target gray scale at S101, the gamma tuning method according to the embodiments of the present application may further include the following steps S701 to S705.

S701: acquiring first history register values of first display areas of a plurality of test display panels after gamma tuning and second history register values of second display areas of the plurality of test display panels.

For example, in some examples, history register values of 575 display panels, including a first history register value of the first display area of each display panel and a second history register value of the second display area of each display panel, are retrieved from production data (i.e., history data). Herein, in order to facilitate differentiation, the retrieved display panel for which gamma tuning have been historically performed is referred to as the test display panel.

S702: determining a slope of the linear relationship according to the first history register values and the second history register values.

After the first history register values of the first display areas of the plurality of test display panels after gamma tuning and the second history register values of the second display areas of the plurality of test display panels are obtained, i.e., after a plurality of groups (x1, y1), (x2, y2), (x3, y3), . . . , (xn, yn) are obtained, a slope a of the linear relationship y=ax±b corresponding to the display panel may be obtained by curve fitting or calculation.

S703: acquiring a second register value of the first display area of the display panel after gamma tuning under a first gray scale and a third register value of the second display area of the display panel after gamma tuning under the first gray scale.

Herein, the first gray scale may be any gray scale, such as gray scale 255. In S703, gamma tuning may be performed on the first display area of the display panel under a plurality of gray scales, to obtain register values of the first display area of the display panel under the plurality of gray scales. The plurality of gray scales may include the first gray scale to obtain a register value of the first display area of the display panel under the first gray scale. Herein, in order to facilitate differentiation, the register value of the first display area of the display panel under the first gray scale is referred to as the second register value. In addition, gamma tuning may be further performed on the second display area of the display panel under the first gray scale according to preset target brightness and target color coordinates, to obtain a register value of the second display area of the display panel under the first gray scale. Herein, in order to facilitate differentiation, the register value of the second display area of the display panel under the first gray scale is referred to as the third register value.

S704: determining an intercept of the linear relationship according to the second register value and the third register value.

Since the slope a of the linear relationship y=ax±b corresponding to the display panel has been determined, the intercept b of the linear relationship corresponding to the display panel can be determined by substituting the second register value and the third register value into the linear relationship y=ax±b corresponding to the display panel.

S705: obtaining the linear relationship according to the slope and the intercept of the linear relationship.

After both the slope a and the intercept b of the linear relationship corresponding to the display panel are determined, the linear relationship corresponding to the display panel can be obtained.

In this manner, in the embodiments of the present application, the slope of the linear relationship between register values of the first display area and register values of the second display area corresponding to the display panel is obtained quickly according to the history register values of the first display areas and the second display areas of the test display panels; and then the intercept of the linear relationship between register values of the first display area and register values of the second display area corresponding to the display panel is obtained according to the register values of the first display area and the second display area of the display panel itself under the first gray scale, to ensure that the obtained linear relationship between register values of the first display area and register values of the second display area conforms to the actual situation of the display panel itself, i.e., has higher accuracy, to ensure the accuracy of the finally obtained target register value.

According to some embodiments of the present application, the target gray scale may be any of a plurality of gray scales other than the first gray scale. For example, if the first gray scale is gray scale 255, the target gray scale may be any of gray scales 0 to 254. In the process of gamma tuning, a plurality of gray scale binding points are usually arranged, in which the first gray scale may be used as a gray scale binding point, and the target gray scale may be any of a plurality of gray scale binding points other than the gray scale binding point where the first gray scale is located, which is not limited in the embodiments of the present application.

In this manner, for the plurality of gray scales other than the first gray scale, the target register value of the second display area under each gray scale is determined through the linear relationship between register values of the first display area and register values of the second display area, and thus it is not necessary to perform gamma tuning on the second display area under the plurality of gray scales other than the first gray scale; not only it is ensured that no color deviation occurs in the second display area, but also gamma tuning time for the second display area and the whole display panel is significantly saved, which improves the production efficiency of the display panel.

According to some embodiments of the present application, different linear relationships may be established for the sub-pixels of different colors. Specifically, the first display area and the second display area may each include sub-pixels of n colors, and n is an integer greater than or equal to 1.

The first history register values may include first sub-history register values corresponding to the sub-pixels of n colors in one-to-one correspondence, and the second history register values may include second sub-history register values corresponding to the sub-pixels of n colors in one-to-one correspondence.

Accordingly, the determining the slope of the linear relationship according to the first history register values and the second history register values at S702 may specifically include: for sub-pixels of any $i^{th}$ color of the sub-pixels of n colors, determining a slope of a sub-linear relationship according to the first sub-history register values corresponding to the sub-pixels of the $i^{th}$ color in the plurality of test display panels and the second sub-history register values corresponding to the sub-pixels of the $i^{th}$ color in the plurality of test display panels; the sub-linear relationship including a linear relationship between register values of the sub-pixels of the $i^{th}$ color in the first display area and register values of the sub-pixels of the $i^{th}$ color in the second display area.

Exemplarily, the first display area and the second display area may each include sub-pixels of three colors, i.e., red sub-pixels, green sub-pixels, and blue sub-pixels. For the red sub-pixel, a slope of a sub-linear relationship corresponding to the red sub-pixel may be determined according to the first sub-history register values corresponding to the red sub-pixel and the second sub-history register values corresponding to the red sub-pixel. For the green sub-pixel, a slope of a sub-linear relationship corresponding to the green sub-pixel may be determined according to the first sub-history register values corresponding to the green sub-pixel and the second sub-history register values corresponding to the green sub-pixel. For the blue sub-pixel, a slope of a sub-linear relationship corresponding to the blue sub-pixel may be determined according to the first sub-history register values corresponding to the blue sub-pixel and the second sub-history register values corresponding to the blue sub-pixel.

The second register value may include second sub-register values corresponding to the sub-pixels of n colors in one-to-one correspondence, and the third register value may include third sub-register values corresponding to the sub-pixels of n colors in one-to-one correspondence.

Accordingly, the determining the intercept of the linear relationship according to the second register value and the third register value at S704 may specifically include: determining an intercept of the sub-linear relationship according to the second sub-register values corresponding to the sub-pixels of the $i^{th}$ color in the display panel and the third sub-register values corresponding to the sub-pixels of the $i^{th}$ color in the display panel.

Exemplarily, for the red sub-pixel, an intercept of the sub-linear relationship corresponding to the red sub-pixel may be determined according to the second sub-register values corresponding to the red sub-pixel and the third sub-register values corresponding to the red sub-pixel. For the green sub-pixel, an intercept of the sub-linear relationship corresponding to the green sub-pixel may be determined according to the second sub-register values corresponding to the green sub-pixel and the third sub-register values corresponding to the green sub-pixel. For the blue sub-pixel, an intercept of the sub-linear relationship corresponding to the blue sub-pixel may be determined according to the second sub-register values corresponding to the blue sub-pixel and the third sub-register values corresponding to the blue sub-pixel.

Accordingly, the obtaining the linear relationship according to the slope and the intercept of the linear relationship at S705 may specifically include: obtaining the sub-linear relationship corresponding to the sub-pixels of the $i^{th}$ color according to the slope of the sub-linear relationship corresponding to the sub-pixels of the $i^{th}$ color and the intercept the sub-linear relationship corresponding to the sub-pixels of the $i^{th}$ color.

Exemplarily, for the red sub-pixel, the sub-linear relationship corresponding to the red sub-pixel may be obtained according to the slope of the sub-linear relationship corresponding to the red sub-pixel and the intercept the sub-linear relationship corresponding to the red sub-pixel. For the green sub-pixel, the sub-linear relationship corresponding to the green sub-pixel may be obtained according to the slope of the sub-linear relationship corresponding to the green sub-pixel and the intercept the sub-linear relationship corresponding to the green sub-pixel. For the blue sub-pixel, the sub-linear relationship corresponding to the blue sub-pixel may be obtained according to the slope of the sub-linear relationship corresponding to the blue sub-pixel and the intercept the sub-linear relationship corresponding to the blue sub-pixel.

In this manner, for the sub-pixels of different colors, the slope of the linear relationship between register values of the first display area and register values of the second display area corresponding to the sub-pixels of each color in the display panel is quickly obtained according to the history register values of the sub-pixels of each color in the first display areas and the second display areas of the test display panels; and then the intercept of the linear relationship between register values of the first display area and register values of the second display area corresponding to the sub-pixels of each color in the display panel is obtained according to the register values of the sub-pixels of each color in the first display area and the second display area of the display panel itself under the first gray scale, to ensure that the obtained linear relationship between register values of the first display area and register values of the second display area corresponding to the sub-pixels of each color in the display panel conforms to the actual situation of the display panel itself, i.e., has higher accuracy, to ensure the accuracy of the finally obtained target register values corresponding to the sub-pixels of each color in the display panel.

In order to ensure better display effect, gamma tuning may be performed respectively for different refresh rates and different brightness levels in the process of gamma tuning. Table 1 schematically shows the number of groups of gray scale binding points taken in the process of gamma tuning.

TABLE 1

| | target brightness of main screen gamma tuning (unit: nit) | | | | | | | | |
|---|---|---|---|---|---|---|---|---|---|
| | 2.2 | 6.1 | 10.3 | 20.4 | 51.2 | 122.7 | 306.7 | 460 | 700 |
| 5100h = (hexadecimal) | 000A | 001B | 002E | 005B | 00E4 | 0222 | 0555 | 07FF | 0FFF |
| gamma segment | Normal8 | Normal7 | Normal6 | Normal5 | Normal4 | Normal3 | Normal2 | Normal1 | HBM& LHBM |
| gamma segment of main screen 60 Hz | Gamma02 | Gamma03 | Gamma04 | Gamma05 | Gamma06 | Gamma07 | Gamma08 | Gamma09 | Gamma10 |
| gamma segment of sub-screen 60 Hz | Gamma42 | Gamma43 | Gamma44 | Gamma45 | Gamma46 | Gamma47 | Gamma48 | Gamma49 | Gamma50 |
| gamma segment of main screen 120 Hz | Gamma22 | Gamma23 | Gamma24 | Gamma25 | Gamma26 | Gamma27 | Gamma28 | Gamma29 | Gamma30 |
| gamma segment of sub-screen 120 Hz | Gamma62 | Gamma63 | Gamma64 | Gamma65 | Gamma66 | Gamma67 | Gamma68 | Gamma69 | Gamma70 |

As shown in Table 1, the brightness of the display panel may include a plurality of brightness levels, such as 2.2 nit, 6.1 nit, 10.3 nit, 20.4 nit, 51.2 nit, 122.7 nit, 306.7 nit, and 460 nit. The display panel may support a plurality of refresh rates, such as 60 Hz and 120 Hz. Then, gamma tuning may be performed respectively for different refresh rates and different brightness levels in the process of gamma tuning. In Table 1, each Gamma (i) of Gamma02-Gamma10, gamma42-Gamma50, gamma22-Gamma30, and Gamma62-Gamma70 represents a group of gamma segments which may include a plurality of gray scale binding points. For example, Gamma02 includes 15 gray scale binding points, Gamma03 includes 15 gray scale binding points, . . . , and Gamma70 includes 15 gray scale binding points. For example, at the refresh rate 60 Hz and brightness level 2.2 nit, the main screen tunes a group of gamma segments (i.e., Gamma02), and the sub-screen tunes a group of gamma segments (i.e., Gamma42). At the refresh rate 120 Hz and brightness level 2.2 nit, the main screen tunes a group of gamma segments (i.e., Gamma22), and the sub-screen tunes a group of gamma segments (i.e., Gamma62). If the conventional gamma tuning method is used, 36 groups of gamma segments (i.e., Gamma02-Gamma10, Gamma42-Gamma50, Gamma22-Gamma30 and Gamma62-Gamma70) are required to be tuned in the whole process of gamma tuning, and thus the gamma tuning time is long.

In some embodiments of the present application, for different refresh rates and different brightness levels, the linear relationships respectively corresponding to different refresh rates and different brightness levels are determined, and then the target register value of the second display area under the target gray scale corresponding to each refresh rate and each brightness level is determined according to the linear relationship corresponding to each refresh rate and each brightness level, which can reduce the number of groups of gray scale binding points required for gamma tuning, and reduce the gamma tuning time.

Specifically, according to some embodiments of the present application, each of the brightness levels may correspond to M gray scales, and M is an integer greater than or equal to 1. M can be flexibly adjusted according to actual situation, for example, M=15, which is not limited in the embodiments of the present application.

The first history register values may include history register values of the first display area of the plurality of test display panels at a target refresh rate under the plurality of brightness levels, the second history register values may include history register values of the second display area of the plurality of test display panels at the target refresh rate under the plurality of brightness levels, and the target refresh rate includes at least one refresh rate. For example, the first history register values may include history register values of the first display area of the plurality of test display panels at the refresh rate 60 Hz and under the brightness level 2.2 nit, history register values at the refresh rate 60 Hz and under the brightness level 6.1 nit, . . . , and history register values at the refresh rate 120 Hz and under the brightness level 2.2 nit, etc. For example, the second history register value may include history register values of the second display area of the plurality of test display panels at the refresh rate 60 Hz and under the brightness level 2.2 nit, history register values at the refresh rate 60 Hz and under the brightness level 6.1 nit, . . . , and history register values at the refresh rate 120 Hz and under the brightness level 2.2 nit, etc.

Accordingly, the determining the slope of the linear relationship according to the first history register values and the second history register values at S702 may specifically include: determining, according to a history register value of the first display area at any $x^{th}$ refresh rate and under a $y^{th}$ brightness level and a history register value of the second display area at the $x^{th}$ refresh rate and under the $y^{th}$ brightness level, the slope of the linear relationship corresponding to the $x^{th}$ refresh rate and the $y^{th}$ brightness level.

For example, the slope of the linear relationship corresponding to the refresh rate 60 Hz and the brightness level 2.2 nit is determined according to a history register value of the first display area of the plurality of test display panels at the refresh rate 60 Hz and under the brightness level 2.2 nit and a history register value of the second display area of the plurality of test display panels at the refresh rate 60 Hz and under the brightness level 2.2 nit. For example, the slope of the linear relationship corresponding to the refresh rate 60 Hz and the brightness level 6.1 nit is determined according to a history register value of the first display area of the plurality of test display panels at the refresh rate 60 Hz and under the brightness level 6.1 nit and a history register value of the second display area of the plurality of test display panels at the refresh rate 60 Hz and under the brightness level 6.1 nit. The same applies to other refresh rates and brightness levels, which is not repeated herein.

The second register value may include register values of the first display area of the display panel under the first gray scale respectively corresponding to the plurality of brightness levels at the target refresh rate, the third register value may include register values of the second display area of the display panel under the first gray scale respectively corresponding to the plurality of brightness levels at the target refresh rate.

Accordingly, the determining the intercept of the linear relationship according to the second register value and the third register value at S704 may specifically include: determining, according to register values of the first display area and the second display area under the first gray scale corresponding to the $x^{th}$ refresh rate and the $y^{th}$ brightness level, the intercept of the linear relationship corresponding to the $x^{th}$ refresh rate and the $y^{th}$ brightness level.

For example, the intercept of the linear relationship corresponding to the refresh rate 60 Hz and the brightness level 2.2 nit is determined according to a register value of the first display area of the display panel under the first gray scale corresponding to the refresh rate 60 Hz and the brightness level 2.2 nit and a register value of the second display area of the display panel under the first gray scale corresponding to the refresh rate 60 Hz and the brightness level 2.2 nit. For example, the intercept of the linear relationship corresponding to the refresh rate 60 Hz and the brightness level 6.1 nit is determined according to a register value of the first display area of the display panel under the first gray scale corresponding to the refresh rate 60 Hz and the brightness level 6.1 nit and a register value of the second display area of the display panel under the first gray scale corresponding to the refresh rate 60 Hz and the brightness level 6.1 nit. The same applies to other refresh rates and brightness levels, which is not repeated herein.

Accordingly, the obtaining the linear relationship according to the slope and the intercept of the linear relationship at S705 may specifically include: obtaining the linear relationship corresponding to the $x^{th}$ refresh rate and the $y^{th}$ brightness level according to the slope and the intercept of the linear relationship corresponding to the $x^{th}$ refresh rate and the $y^{th}$ brightness level.

For example, the linear relationship corresponding to the refresh rate 60 Hz and the brightness level 2.2 nit is obtained according to the slope the linear relationship corresponding to the refresh rate 60 Hz and the brightness level 2.2 nit and the intercept of the linear relationship corresponding to the refresh rate 60 Hz and the brightness level 2.2 nit. For example, the linear relationship corresponding to the refresh rate 60 Hz and the brightness level 6.1 nit is obtained according to the slope the linear relationship corresponding to the refresh rate 60 Hz and the brightness level 6.1 nit and the intercept of the linear relationship corresponding to the refresh rate 60 Hz and the brightness level 6.1 nit. The same applies to other refresh rates and brightness levels, which is not repeated herein.

According to some embodiments of the present application, the first register value may include register values of the first display area of the display panel under the target gray scale respectively corresponding to the plurality of brightness levels at the target refresh rate. Accordingly, the determining, according to the first register value and the predetermined linear relationship between register values of the first display area and register values of the second display area, the target register value of the second display area under the target gray scale at S102 may specifically include: determining, according to the linear relationship corresponding to the $x^{th}$ refresh rate and the $y^{th}$ brightness level and a register value of the first display area under the target gray scale corresponding to the $x^{th}$ refresh rate and the $y^{th}$ brightness level, the target register value of the second display area under the target gray scale corresponding to the $x^{th}$ refresh rate and the $y^{th}$ brightness level.

For example, the target register value of the second display area under the target gray scale corresponding to the refresh rate 60 Hz and the brightness level 2.2 nit is determined according to the linear relationship corresponding to the refresh rate 60 Hz and the brightness level 2.2 nit and a register value of the first display area of the display panel under the target gray scale corresponding to the refresh rate 60 Hz and the brightness level 2.2 nit. For example, the target register value of the second display area under the target gray scale corresponding to the refresh rate 120 Hz and the brightness level 2.2 nit is determined according to the linear relationship corresponding to the refresh rate 120 Hz and the brightness level 2.2 nit and a register value of the first display area of the display panel under the target gray scale corresponding to the refresh rate 120 Hz and the brightness level 2.2 nit. The same applies to other refresh rates and brightness levels, which is not repeated herein.

In this manner, for different refresh rates and different brightness levels, the linear relationships respectively corresponding to different refresh rates and different brightness levels are determined, and then the target register value of the second display area under the target gray scale corresponding to each refresh rate and each brightness level is determined according to the linear relationship corresponding to each refresh rate and each brightness level, which can further improve the accuracy of the finally obtained target register value of the second display area under the target gray scale.

In conjunction with the above-mentioned Table 1, for example, the first display area is the main screen and the second display area is the sub-screen. In the embodiments of the present application, only 18 groups of gamma segments (i.e., Gamma02-Gamma10 and Gamma22-Gamma30) corresponding to the main screen and 18 first gray scales (such as gray scale 255 in the 18 groups of gamma segments) of the sub-screen are required to be tuned, and the time required for tuning the 18 first gray scales is approximately the time required for tuning one group of gamma segments (such as 15 gray scale binding points). Therefore, in the embodiment of the present application, instead of 36 groups of gamma segments which are originally required to be tuned, only (18+1) groups of gamma segments are tuned, which significantly saves the gamma tuning time and improves the production efficiency of the display panel.

In some specific examples, in conjunction with sub-pixels of different colors, for example, a target register value of a red sub-pixel in the second display area under the target gray scale corresponding to the refresh rate 60 Hz and the brightness level 2.2 nit may be determined according to the linear relationship corresponding to the red sub-pixel at the refresh rate 60 Hz and under the brightness level 2.2 nit and a register value of the red sub-pixel in the first display area of the display panel under the target gray scale corresponding to the refresh rate 60 Hz and the brightness level 2.2 nit. For example, a target register value of the red sub-pixel in the second display area under the target gray scale corresponding to the refresh rate 120 Hz and the brightness level 2.2 nit may be determined according to the linear relationship corresponding to the red sub-pixel at the refresh rate 120 Hz and under the brightness level 2.2 nit and a register value of the red sub-pixel in the first display area of the display panel under the target gray scale corresponding to the refresh rate 120 Hz and the brightness level 2.2 nit.

For example, a target register value of a green sub-pixel in the second display area under the target gray scale corresponding to the refresh rate 60 Hz and the brightness level 2.2 nit may be determined according to the linear relationship corresponding to the green sub-pixel at the refresh rate 60 Hz and under the brightness level 2.2 nit and a register value of the green sub-pixel in the first display area of the display panel under the target gray scale corresponding to the refresh rate 60 Hz and the brightness level 2.2 nit. For example, a target register value of the green sub-pixel in the second display area under the target gray scale corresponding to the refresh rate 120 Hz and the brightness level 2.2 nit may be determined according to the linear relationship corresponding to the green sub-pixel at the refresh rate 120 Hz and under the brightness level 2.2 nit and a register value of the green sub-pixel in the first display area of the display panel under the target gray scale corresponding to the refresh rate 120 Hz and the brightness level 2.2 nit.

For example, a target register value of a blue sub-pixel in the second display area under the target gray scale corresponding to the refresh rate 60 Hz and the brightness level 2.2 nit may be determined according to the linear relationship corresponding to the blue sub-pixel at the refresh rate 60 Hz and under the brightness level 2.2 nit and a register value of the blue sub-pixel in the first display area of the display panel under the target gray scale corresponding to the refresh rate 60 Hz and the brightness level 2.2 nit. For example, a target register value of the blue sub-pixel in the second display area under the target gray scale corresponding to the refresh rate 120 Hz and the brightness level 2.2 nit may be determined according to the linear relationship corresponding to the blue sub-pixel at the refresh rate 120 Hz and under the brightness level 2.2 nit and a register value of the blue sub-pixel in the first display area of the display panel under the target gray scale corresponding to the refresh rate 120 Hz and the brightness level 2.2 nit.

Figure 8:
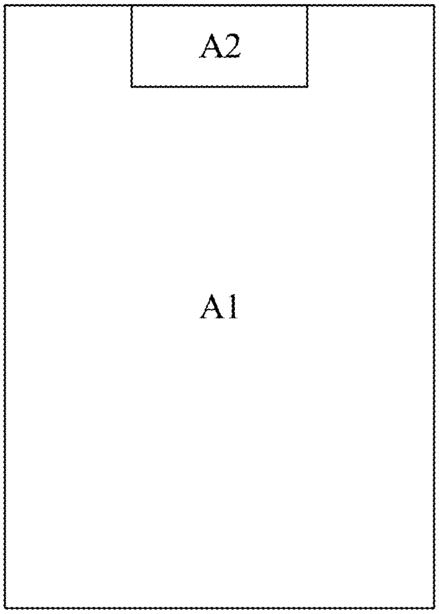
FIG. 8 shows a schematic structural diagram of a display panel to which the gamma tuning method according to an embodiment of the present application is applied.

FIG. 8 shows a schematic structural diagram of a display panel to which the gamma tuning method according to an embodiment of the present application is applied. As shown in FIG. 8, according to some embodiments of the present application, a light transmittance of the first display area A1 may be less than a light transmittance of the second display area A2. That is, the first display area A1 may be the main screen, and the second display area A2 may be the sub-screen.

In this manner, the target register value of the second display area (i.e., the sub-screen) under the target gray scale is determined according to the first register value of the first display area (i.e., the main screen) under the target gray scale and the linear relationship between register values of the first display area and register values of the second display area, and thus it is not necessary to perform gamma tuning on the sub-screen under the target gray scale; not only it is ensured that no color deviation occurs in the sub-screen, but also gamma tuning time for the sub-screen and the whole display panel is saved, which improves the production efficiency of the display panel.

In other embodiments, the light transmittance of the first display area A1 may be greater than the light transmittance of the second display area A2. That is, the first display area A1 may be the sub-screen, and the second display area A2 may be the main screen.

In this manner, the target register value of the second display area (i.e., the main screen) under the target gray scale is determined according to the first register value of the first display area (i.e., the sub-screen) under the target gray scale and the linear relationship between register values of the first display area and register values of the second display area, and thus it is not necessary to perform gamma tuning on the main screen under the target gray scale; not only it is ensured that no color deviation occurs in the main screen, but also gamma tuning time for the main screen and the whole display panel is saved, which improves the production efficiency of the display panel.

Based on the gamma tuning method according to the above embodiments, the embodiments of the present application further provide a specific implementation of a gamma tuning apparatus accordingly.

A gamma tuning apparatus according to an embodiment of the present application is applied to a display panel which may include a first display area and a second display area.

Figure 9:
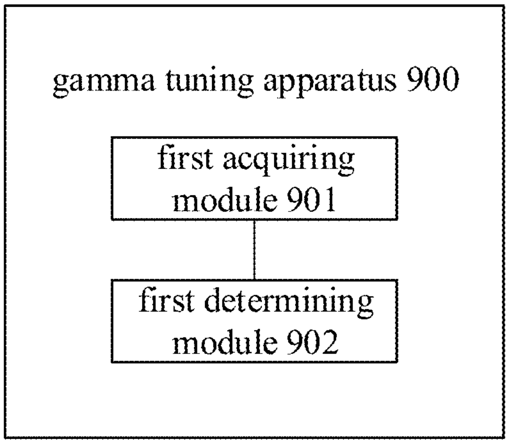
FIG. 9 shows a schematic structural diagram of a gamma tuning apparatus according to an embodiment of the present application.

FIG. 9 shows a schematic structural diagram of a gamma tuning apparatus according to an embodiment of the present application. As shown in FIG. 9, the gamma tuning apparatus 900 according to the embodiments of the present application may include: a first acquiring module 901 configured to acquire a first register value of the first display area after gamma tuning under a target gray scale; and a first determining module 902 configured to determine, according to the first register value and a predetermined linear relationship between register values of the first display area and register values of the second display area, a target register value of the second display area under the target gray scale.

In the gamma tuning apparatus according to the embodiments of the present application, the target register value of the second display area under the target gray scale is determined according to the first register value of the first display area under the target gray scale and the linear relationship between register values of the first display area and register values of the second display area, and thus it is not necessary to perform gamma tuning on the second display area under the target gray scale; not only it is ensured that no color deviation occurs in the second display area, but also gamma tuning time for the second display area and the whole display panel is saved, which improves the production efficiency of the display panel.

In some embodiments, the first display area and the second display area each include sub-pixels of n colors, the first register value includes first sub-register values corresponding to the sub-pixels of n colors in one-to-one correspondence, and n is an integer greater than or equal to 1. The first determining module 902 is further configured to: for a sub-pixel of any $i^{th}$ color of the sub-pixels of n colors, determine, according to the first sub-register value corresponding to the sub-pixel of the $i^{th}$ color and a linear relationship between a register value of the sub-pixel of the $i^{th}$ color in the first display area and a register value of the sub-pixel of the $i^{th}$ color in the second display area, a target register value of the sub-pixel of the $i^{th}$ color in the second display area under the target gray scale.

In some embodiments, the gamma tuning apparatus 900 according to the embodiments of the present application may further include a linear relationship determining module configured to: acquire first history register values of first display areas of a plurality of test display panels after gamma tuning and second history register values of second display areas of the plurality of test display panels; determine a slope of the linear relationship according to the first history register values and the second history register values; acquire a second register value of the first display area of the display panel after gamma tuning under a first gray scale and a third register value of the second display area of the display panel after gamma tuning under the first gray scale; determine an intercept of the linear relationship according to the second register value and the third register value; and obtain the linear relationship according to the slope and the intercept of the linear relationship.

In some embodiments, the target gray scale is any of a plurality of gray scales other than the first gray scale.

In some embodiments, the first display area and the second display area each include sub-pixels of n colors, and n is an integer greater than or equal to 1. The first history register values include first sub-history register values corresponding to the sub-pixels of n colors in one-to-one correspondence, and the second history register values include second sub-history register values corresponding to the sub-pixels of n colors in one-to-one correspondence. The second register value includes second sub-register values corresponding to the sub-pixels of n colors in one-to-one correspondence, and the third register value includes third sub-register values corresponding to the sub-pixels of n colors in one-to-one correspondence. The linear relationship determining module is further configured to: for sub-pixels of any $i^{th}$ color of the sub-pixels of n colors, determine a slope of a sub-linear relationship according to the first sub-history register values corresponding to the sub-pixels of the $i^{th}$ color in the plurality of test display panels and the second sub-history register values corresponding to the sub-pixels of the $i^{th}$ color in the plurality of test display panels; the sub-linear relationship including a linear relationship between register values of the sub-pixels of the $i^{th}$ color in the first display area and register values of the sub-pixels of the $i^{th}$ color in the second display area; and determine an intercept of the sub-linear relationship according to the second sub-register values corresponding to the sub-pixels of the $i^{th}$ color in the display panel and the third sub-register values corresponding to the sub-pixels of the $i^{th}$ color in the display panel.

In some embodiments, a brightness of the display panel includes a plurality of brightness levels, each of the brightness levels corresponds to M gray scales, and Mis an integer greater than or equal to 1. The first history register values include history register values of the first display area at a target refresh rate under the plurality of brightness levels, the second history register values include history register values of the second display area at the target refresh rate under the plurality of brightness levels, and the target refresh rate includes at least one refresh rate. The third register value includes register values of the second display area under the first gray scale respectively corresponding to the plurality of brightness levels at the target refresh rate. The linear relationship determining module is further configured to: determine, according to a history register value of the first display area at any $x^{th}$ refresh rate and under a $y^{th}$ brightness level and a history register value of the second display area at the $x^{th}$ refresh rate and under the $y^{th}$ brightness level, the slope of the linear relationship corresponding to the $x^{th}$ refresh rate and the $y^{th}$ brightness level; determine, according to register values of the first display area and the second display area under the first gray scale corresponding to the $x^{th}$ refresh rate and the $y^{th}$ brightness level, the intercept of the linear relationship corresponding to the $x^{th}$ refresh rate and the $y^{th}$ brightness level; and obtain the linear relationship corresponding to the $x^{th}$ refresh rate and the $y^{th}$ brightness level according to the slope and the intercept of the linear relationship corresponding to the $x^{th}$ refresh rate and the $y^{th}$ brightness level.

In some embodiments, the first register value includes register values of the first display area under the target gray scale respectively corresponding to the plurality of brightness levels at the target refresh rate. The first determining module 902 is further configured to: determine, according to the linear relationship corresponding to the $x^{th}$ refresh rate and the $y^{th}$ brightness level and a register value of the first display area under the target gray scale corresponding to the $x^{th}$ refresh rate and the $y^{th}$ brightness level, the target register value of the second display area under the target gray scale corresponding to the $x^{th}$ refresh rate and the $y^{th}$ brightness level.

In some embodiments, a light transmittance of the first display area is different from a light transmittance of the second display area.

In some embodiments, the light transmittance of the first display area is less than the light transmittance of the second display area.

The various modules/units in the apparatus shown in FIG. 9 are able to implement the various steps in the above method embodiments and achieve corresponding effects thereof, which are not repeated herein for brevity.

Based on the gamma tuning method according to the above-mentioned embodiments, the embodiments of the present application further provide a specific implementation of an electronic device accordingly. Reference is made to the embodiments described below.

Figure 10:
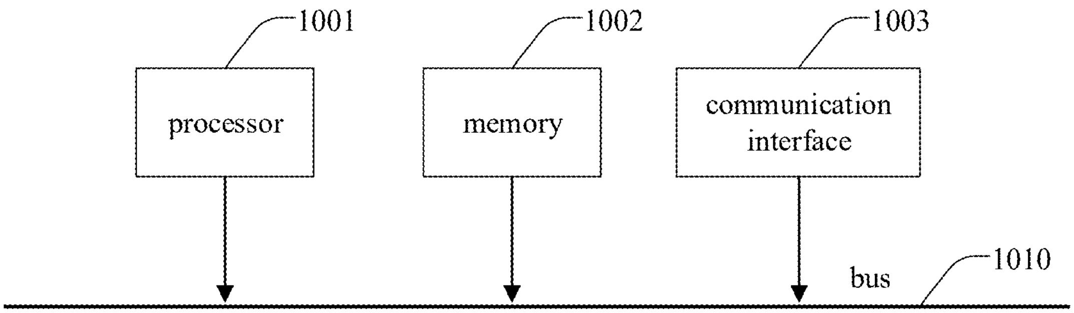
FIG. 10 shows a schematic structural diagram of hardware of an electronic device according to an embodiment of the present application.

FIG. 10 shows a schematic structural diagram of hardware of an electronic device according to an embodiment of the present application.

The electronic device may include a processor 1001 and a memory 1002 storing computer program instructions.

In one embodiment, the processor 1001 may include a central processing unit (CPU), or an application specific integrated circuit (ASIC), or one or more integrated circuits that may be configured to implement the embodiments of the present application.

The memory 1002 may include a mass memory for data or instructions. By way of example, and not limitation, the memory 1002 may include a hard disk drive (HDD), a floppy disk drive, a flash memory, an optical disk, a magneto-optical disk, a magnetic tape, or a universal serial bus (USB) drive, or a combination of two or more of the above. In some instances, the memory 1002 may include a removable or non-removable (or fixed) medium, or the memory 1002 may be a non-volatile solid state memory. The memory 1002 may be internal or external to the electronic device.

In an example, the memory 1002 may be a read-only memory (ROM). In an example, the ROM may be a mask programmed ROM, a programmable ROM (PROM), an erasable PROM (EPROM), an electrically erasable PROM (EEPROM), an electrically alterable ROM (EAROM), or a flash memory, or a combination of two or more of the above.

The memory 1002 may include a read-only memory (ROM), a random access memory (RAM), a magnetic disk storage media device, an optical storage media device, a flash memory device, an electrical, optical or other physical/tangible memory storage device. Thus, the memory generally includes one or more tangible (non-transitory) computer-readable storage media (for example, memory devices) encoded with software which includes computer-executable instructions, and the software, when executed (for example, by one or more processors), is operable to perform the operations described with reference to the methods according to embodiments of the present application.

The processor 1001 reads and executes computer program instructions stored in the memory 1002 to implement the methods/steps S101 to S102 in the embodiments shown in FIG. 4 and achieve the corresponding effects of the instances shown in FIG. 4 performing the methods/steps thereof, which are not repeated herein for brevity.

In an example, the electronic device may further include a communication interface 1003 and a bus 1010. Herein, as shown in FIG. 10, the processor 1001, the memory 1002, and the communication interface 1003 are connected to and communicate with one another through the bus 1010.

The communication interface 1003 is mainly configured to realize communication between various modules, apparatuses, units and/or devices in the embodiments of the present application.

The bus 1010 includes hardware, software, or both of them, to couple components of the electronic device to each other. As an example rather than limitation, the bus may include an Accelerated Graphics Port (AGP) or other graphics bus, an Extended Industry Standard Architecture (EISA) bus, a Front Side Bus (FSB), a Hyper Transport (HT) interconnect, an Industry Standard Architecture (ISA) bus, a wireless band interconnect, a Low Pin Count (LPC) bus, a memory bus, a Micro Channel Architecture (MCA) bus, a Peripheral Component Interconnect (PCI) bus, a PCI-Express (PCI-X) bus, a Serial Advanced Technology Attachment (SATA) bus, a Video Electronics Standards Association Local Bus (VLB) bus, or other suitable bus, or a combination of two or more of the above. Where appropriate, the bus 1010 may include one or more buses. Although the embodiments of the present application describe and illustrate a particular bus, any suitable bus or interconnect is considered in the present application.

In addition, the embodiments of the present application may provide a computer-readable storage medium in conjunction with the gamma tuning method in the embodiments described above. The computer-readable storage medium stores computer program instructions thereon, in which the computer program instructions, when executed by a processor, implement any of the gamma tuning methods in the above embodiments. An example of the computer-readable storage medium includes a non-transitory computer-readable storage media such as an electronic circuit, a semiconductor memory device, a ROM, a random access memory, a flash memory, an erasable ROM (EROM), a floppy disk, a CD-ROM, an optical disk, and a hard disk.

It should be noted that, the present application is not limited to the specific configuration and process as described above and shown in the drawings. For brevity, detailed description of the known methods is omitted here. In the above embodiments, several specific steps are described and shown as examples. However, the method of the present application is not limited to the specific steps as described and shown, various changes, modifications, and additions, or can change the sequence of the steps after comprehending the gist of the present application.

The functional blocks shown in the above structural block diagrams may be implemented as hardware, software, firmware, or a combination thereof. When implemented as hardware, it may be, for example, an electronic circuit, an application specific integrated circuit (ASIC), suitable firmware, a plug-in, a functional card, and the like. When implemented as software, elements of the present application are programs or code segments used to perform required tasks. The programs or code segments may be stored in a machine-readable medium, or transmitted on a transmission medium or a communication link through a data signal carried in a carrier wave. The "machine-readable medium" may include any medium that can store or transmit information. An example of the machine-readable medium includes an electronic circuit, a semiconductor memory device, a ROM, a flash memory, an erasable ROM (EROM), a floppy disk, a CD-ROM, an optical disk, a hard disk, a fiber optic medium, a radio frequency (RF) link, and the like. The code segments may be downloaded via a computer network such as the Internet, intranet, and the like.

It should also be noted that, in the exemplary embodiments described in the present application, some methods or systems are described based on a series of steps or apparatuses. However, the present application is not limited to the above order of the steps, that is, the steps may be executed in the order described in the embodiments or in orders different from that in the embodiments, or several steps may be executed at the same time.

Embodiments of the present application are described above with reference to flowcharts and/or block diagrams of methods, devices (systems) and computer program products according to the embodiments of the present application. It should be understood that each block of the flowchart illustrations and/or the block diagrams, and a combination of various blocks of the flowchart illustrations and/or the block diagrams may be implemented by the computer program instructions. These computer program instructions may be provided to a processor of a general purpose computer, a special purpose computer, or other programmable data processing apparatuses to produce a machine and the execution of the instructions via the processor of the computer or other programmable data processing apparatuses enables the implementation of the functions/actions specified in one or more blocks of the flowchart illustrations and/or block diagrams. Such processor may be, but is not limited to, a general purpose processor, a special purpose processor, an application specific processor, or a field programmable logic circuit. It should also be understood that each block of the block diagrams and/or the flowchart diagrams, and a combination of the blocks of the block diagrams and/or the flowchart diagrams may also be implemented by special purpose hardware that performs specified functions or actions, or by a combination of the special purpose hardware and computer instructions.

The above provides only some embodiments of the present application, the specific working processes of the above systems, modules and units may be referred to the corresponding processes in the foregoing method embodiments, which are not repeated herein for the convenience and brevity of the description. It should be understood that the protection scope of the present application is not limited to the above.

What is claimed is:

1. A gamma tuning method, applied to a display panel, comprising:

a first display area and a second display area, the method comprising:

acquiring a first register value of the first display area after gamma tuning under a target gray scale;

determining, according to the first register value and a predetermined linear relationship between register values of the first display area and register values of the second display area, a target register value of the second display area under the target gray scale;

wherein the first display area and the second display area respectively comprise sub-pixels of n colors, the first register value comprises first sub-register values corresponding to the sub-pixels of n colors in one-to-one correspondence, and n is an integer greater than or equal to 1; and wherein the determining, according to the first register value and the predetermined linear relationship between register values of the first display area and register values of the second display area, the target register value of the second display area under the target gray scale comprises:

for a sub-pixel of any $i^{th}$ color of the sub-pixels of n colors, determining, according to the first sub-register value corresponding to the sub-pixel of the $i^{th}$ color and a linear relationship between a register value of the sub-pixel of the $i^{th}$ color in the first display area and a register value of the sub-pixel of the $i^{th}$ color in the second display area, a target register value of the sub-pixel of the $i^{th}$ color in the second display area under the target gray scale, wherein i is an integer greater than or equal to 1.

2. The method according to claim 1, wherein the first display area and the second display area respectively comprise red sub-pixels, green sub-pixels and blue sub-pixels; and the determining, according to the first register value and the predetermined linear relationship between register values of the first display area and register values of the second display area, the target register value of the second display area under the target gray scale comprises:

for the red sub-pixel, determining, according to the first sub-register value of the red sub-pixel in the first display area after gamma tuning under the target gray scale and a linear relationship between a register value of the red sub-pixel in the first display area and a register value of the red sub-pixel in the second display area, a target register value of the red sub-pixel in the second display area under the target gray scale;

for the green sub-pixel, determining, according to the first sub-register value of the green sub-pixel in the first display area after gamma tuning under the target gray scale and a linear relationship between a register value of the green sub-pixel in the first display area and a register value of the green sub-pixel in the second display area, a target register value of the green sub-pixel in the second display area under the target gray scale; and for the blue sub-pixel, determining, according to the first sub-register value of the blue sub-pixel in the first display area after gamma tuning under the target gray scale and a linear relationship between a register value of the blue sub-pixel in the first display area and a register value of the blue sub-pixel in the second display area, a target register value of the blue sub-pixel in the second display area under the target gray scale.

3. The method according to claim 1, further comprising:

before the acquiring of the first register value of the first display area after gamma tuning under the target gray scale, acquiring first history register values of first display areas of a plurality of test display panels after gamma tuning and second history register values of second display areas of the plurality of test display panels;

determining a slope of the linear relationship according to the first history register values and the second history register values;

acquiring a second register value of the first display area of the display panel after gamma tuning under a first gray scale and a third register value of the second display area of the display panel after gamma tuning under the first gray scale;

determining an intercept of the linear relationship according to the second register value and the third register value; and obtaining the linear relationship according to the slope and the intercept of the linear relationship.

4. The method according to claim 3, wherein the target gray scale is any of a plurality of gray scales other than the first gray scale.

5. The method according to claim 3, wherein the first display area and the second display area respectively comprise sub-pixels of n colors, and n is an integer greater than or equal to 1;

the first history register values comprise first sub-history register values corresponding to the sub-pixels of n colors in one-to-one correspondence, and the second history register values comprise second sub-history register values corresponding to the sub-pixels of n colors in one-to-one correspondence;

the determining the slope of the linear relationship according to the first history register values and the second history register values comprises:

for sub-pixels of any $i^{th}$ color of the sub-pixels of n colors, determining a slope of a sub-linear relationship according to the first sub-history register values corresponding to the sub-pixels of the $i^{th}$ color in the plurality of test display panels and the second sub-history register values corresponding to the sub-pixels of the $i^{th}$ color in the plurality of test display panels; the sub-linear relationship comprising a linear relationship between register values of the sub-pixels of the $i^{th}$ color in the first display area and register values of the sub-pixels of the $i^{th}$ color in the second display area;

the second register value comprises second sub-register values corresponding to the sub-pixels of n colors in one-to-one correspondence, and the third register value comprises third sub-register values corresponding to the sub-pixels of n colors in one-to-one correspondence; and the determining the intercept of the linear relationship according to the second register value and the third register value comprises:

determining an intercept of the sub-linear relationship according to the second sub-register values corresponding to the sub-pixels of the $i^{th}$ color in the display panel and the third sub-register values corresponding to the sub-pixels of the $i^{th}$ color in the display panel.

6. The method according to claim 3, wherein a brightness of the display panel comprises a plurality of brightness levels, each of the brightness levels corresponds to M gray scales, and Mis an integer greater than or equal to 1;

the first history register values comprise history register values of the first display area at a target refresh rate under the plurality of brightness levels, the second history register values comprise history register values of the second display area at the target refresh rate under the plurality of brightness levels, and the target refresh rate comprises at least one refresh rate;

the determining the slope of the linear relationship according to the first history register values and the second history register values comprises:

determining, according to a history register value of the first display area at any $x^{th}$ refresh rate and under a $y^{th}$ brightness level and a history register value of the second display area at the $x^{th}$ refresh rate and under the $y^{th}$ brightness level, the slope of the linear relationship corresponding to the $x^{th}$ refresh rate and the $y^{th}$ brightness level;

the second register value comprises register values of the first display area under the first gray scale respectively corresponding to the plurality of brightness levels at the target refresh rate, the third register value comprises register values of the second display area under the first gray scale respectively corresponding to the plurality of brightness levels at the target refresh rate;

the determining the intercept of the linear relationship according to the second register value and the third register value comprises:

determining, according to register values of the first display area and the second display area under the first gray scale corresponding to the $x^{th}$ refresh rate and the $y^{th}$ brightness level, the intercept of the linear relationship corresponding to the $x^{th}$ refresh rate and the $y^{th}$ brightness level; and the obtaining the linear relationship according to the slope and the intercept of the linear relationship comprises:

obtaining the linear relationship corresponding to the $x^{th}$ refresh rate and the $y^{th}$ brightness level according to the slope and the intercept of the linear relationship corresponding to the $x^{th}$ refresh rate and the $y^{th}$ brightness level, wherein x and y are both integers, each with a value greater than or equal to 1.

7. The method according to claim 6, wherein the first register value comprises register values of the first display area under the target gray scale respectively corresponding to the plurality of brightness levels at the target refresh rate; and the determining, according to the first register value and the predetermined linear relationship between register values of the first display area and register values of the second display area, the target register value of the second display area under the target gray scale comprises:

determining, according to the linear relationship corresponding to the $x^{th}$ refresh rate and the $y^{th}$ brightness level and a register value of the first display area under the target gray scale corresponding to the $x^{th}$ refresh rate and the $y^{th}$ brightness level, the target register value of the second display area under the target gray scale corresponding to the $x^{th}$ refresh rate and the $y^{th}$ brightness level.

8. The method according to claim 7, wherein for sub-pixels of different colors, a target register value of a sub-pixel of each color in the second display area under the target gray scale corresponding to the $x^{th}$ refresh rate and the $y^{th}$ brightness level is determined according to the linear relationship corresponding to the sub-pixel of each color at the $x^{th}$ refresh rate and the $y^{th}$ brightness level and a register value of the sub-pixel of the color in the first display area of the display panel under the target gray scale corresponding to the $x^{th}$ refresh rate and the $y^{th}$ brightness level.

9. The method according to claim 1, wherein a light transmittance of the first display area is different from a light transmittance of the second display area.

10. The method according to claim 9, wherein the light transmittance of the first display area is less than the light transmittance of the second display area.

11. A non-transitory computer-readable storage medium storing a computer program thereon, wherein the computer program, when executed by a processor, implements steps of the gamma tuning method according to claim 1.

12. A gamma tuning apparatus, applied to a display panel comprising:

a first display area and a second display area, the gamma tuning apparatus comprising:

a first acquiring module, implemented by at least one processor and memory, configured to acquire a first register value of the first display area after gamma tuning under a target gray scale; and a first determining module, implemented by the at least one processor and memory, configured to determine, according to the first register value and a predetermined linear relationship between register values of the first display area and register values of the second display area, a target register value of the second display area under the target gray scale;

wherein the first display area and the second display area respectively comprise sub-pixels of n colors, the first register value comprises first sub-register values corresponding to the sub-pixels of n colors in one-to-one correspondence, and n is an integer greater than or equal to 1; and wherein the determining, according to the first register value and the predetermined linear relationship between register values of the first display area and register values of the second display area, the target register value of the second display area under the target gray scale comprises:

for a sub-pixel of any $i^{th}$ color of the sub-pixels of n colors, determining, according to the first sub-register value corresponding to the sub-pixel of the $i^{th}$ color and a linear relationship between a register value of the sub-pixel of the $i^{th}$ color in the first display area and a register value of the sub-pixel of the $i^{th}$ color in the second display area, a target register value of the sub-pixel of the $i^{th}$ color in the second display area under the target gray scale, wherein i is an integer greater than or equal to 1.

* * * * *